United States Patent [19]
Bowman

[11] Patent Number: 5,375,573
[45] Date of Patent: Dec. 27, 1994

[54] LUBRICATION OF TWO-STROKE INTERNAL COMBUSTION ENGINES

[75] Inventor: Timothy J. Bowman, Bexley, United Kingdom

[73] Assignee: Ford Motor Company, Dearborn, Mich.

[21] Appl. No.: 119,017

[22] Filed: Sep. 9, 1993

[51] Int. Cl.$^5$ ............................................. F01M 1/08
[52] U.S. Cl. ............................. 123/196 R; 123/73 AD
[58] Field of Search ............... 123/73 AD, 196 R, 531; 184/55.1

[56] References Cited

U.S. PATENT DOCUMENTS

| | | | |
|---|---|---|---|
| 4,637,493 | 1/1987 | Ehlert | 184/55.1 |
| 5,103,777 | 4/1992 | Daikoku | 123/73 AD |
| 5,113,829 | 5/1992 | Motoyama | 123/531 |

FOREIGN PATENT DOCUMENTS

| | | |
|---|---|---|
| 0376130 | 4/1990 | European Pat. Off. . |
| 2638204 | 4/1990 | France . |
| WO-A-93/08393 | 4/1993 | WIPO . |

Primary Examiner—E. Rollins Cross
Assistant Examiner—Erick Solis
Attorney, Agent, or Firm—Jerome R. Drouillard; Roger L. May

[57] ABSTRACT

In a two-stroke engine having a pressurized air rail for producing an atomized fuel spray for injection into the individual combustion chambers, oil for lubrication is atomized by metering it into a stream of compressed air taken from the rail or a reservoir connected thereto and the resulting oil/air mist is injected into the crankcase and/or the lower part of the cylinder selectively and directly on to points requiring lubrication.

6 Claims, 1 Drawing Sheet

LUBRICATION OF TWO-STROKE INTERNAL COMBUSTION ENGINES

FIELD OF THE INVENTION

1. Background Of The Invention

This invention relates to the lubrication of two-stroke internal combustion engines of the kind in which fuel is injected directly into the individual combustion chambers of the cylinders and the combustion air is pumped separately from the crankcase into the combustion chambers.

2. Description of the Prior Art

Oil for the lubrication of many conventional two cycle engines is metered intermittently into air supplied to the crankcase through an oil jet upstream of a reed valve located at the air intake to the crankcase. The reed valve acts as a non-return valve for the air supply and the vibrating reeds serve to break up the oil into droplets and disperse it in the intake air. It is difficult, however, to control the amount of oil to meet the requirements of the engine, and contact of the reeds at the intake orifice with liquid oil can both affect the dynamic behavior of the reeds and lead-in time to their becoming coated with a gummy deposit that further interferes with their action in breaking up and dispersing the oil. The oil jet may also tend to become blocked by the formation of wax and/or ice at sub-zero temperatures.

FR-A-2 638 204 discloses a pump type two-stroke engine in which part of the air compressed in the crankcase in the power stroke of the piston is used to pre-atomize the oil and to inject the resulting fine mist of oil droplets in air into the crankcase. The air for the atomization is taken from the crankcase of the same or a different cylinder of the engine, but in either case, the flow rate and timing of the oil supply are both dependent on the operation of the engine.

The present invention provides a two-stroke engine having a pressurized air rail for producing an atomized fuel spray for injection into the individual combustion chambers, in which oil for lubrication is atomized by metering it into a stream of compressed air taken from the rail or a reservoir connected thereto and the resulting oil/air mist is injected into the crankcase and/or the lower part of the cylinder selectively and directly on to points requiring lubrication.

In order to fulfill its function in the fuel injection system, the air pressure in the pressurized rail is necessarily in excess of the maximum pressure in the crankcase, so that the compressed air stream used for atomization of the oil will generally be at a pressure of at least 4 bar, and preferably it is 6 bar or more. The pressure does not vary cyclically with the engine operation. The air pressure required for the oil atomization may however be lower than 4 bar.

Oil may be metered intermittently into the stream of compressed air for atomization, but the stream of compressed air into which it is supplied is preferably continuous, so that it continues to issue through the lubricating jets even when it is not loaded with oil.

To reduce the load on the air compressor feeding the pressurized rail, the compressed air supply for the oil atomization may be supplemented, either directly or by way of the compressed air rail or other reservoir, by an engine supercharger, if one is utilized.

Lubrication in this manner, using oil atomized by compressed air at such relatively high and substantially non-fluctuating pressures, brings with it several advantages, particularly when the compressed air flow is continuous. The lubricating oil mist is constantly available during the whole engine cycle, and the atomization is also continuous, enabling very fine droplets of oil to be reliably and consistently formed, thus reducing the risk of combustion detonation. Other advantages include reduced risk of gumming the reeds of the air intake valve, as these are no longer in contact with liquid oil; reduced risk of blockage of the lubricating jets or nozzles by ice or wax at low temperatures, owing to the higher pressure and continuing flow of the stream of air through them; improved delivery under conditions of high lubricant viscosity, especially sub-zero temperatures, and consequently also the possibility of using lower-grade lubricants with higher viscosity; and the ability to selectively lubricate a plurality of components.

In an embodiment of the invention, each cylinder of the engine is provided with a plurality of lubricating jets or nozzles directing the atomized oil locally to such critical components as the small-end bearing, the big-end bearing and the area of the cylinder or cylinder liner contacted by the piston skirt and piston rings. Such jets or nozzles may also be provided to lubricate the main bearings of the crankshaft. Such selective lubrication makes more economical use of the lubricant and hence can reduce oil consumption. It can also help to minimize "short-circuiting" of the lubricant through the transfer line into the combustion chamber.

It is a further advantage of the invention that lubrication is immediately available on starting up the engine, when efficient lubrication is particularly important, since the rail forming the compressed air source is pressurized even when the engine is at a standstill. Should the engine not be used or a prolonged period, the pressure in the compressed air rail or other reservoir may fall somewhat, and it may therefore be desirable, on starting the engine, to control the oil metering system so as to enrich the oil/air mixture until normal operating pressure for the air system is reached.

On stopping the engine, it may also be advantageous to enrich the oil/air mixture temporarily in order to provide an oil film on the lubricated parts, to help protect them from corrosion.

DETAILED DESCRIPTION OF THE PREFERRED EMBODIMENTS

Figure 1:
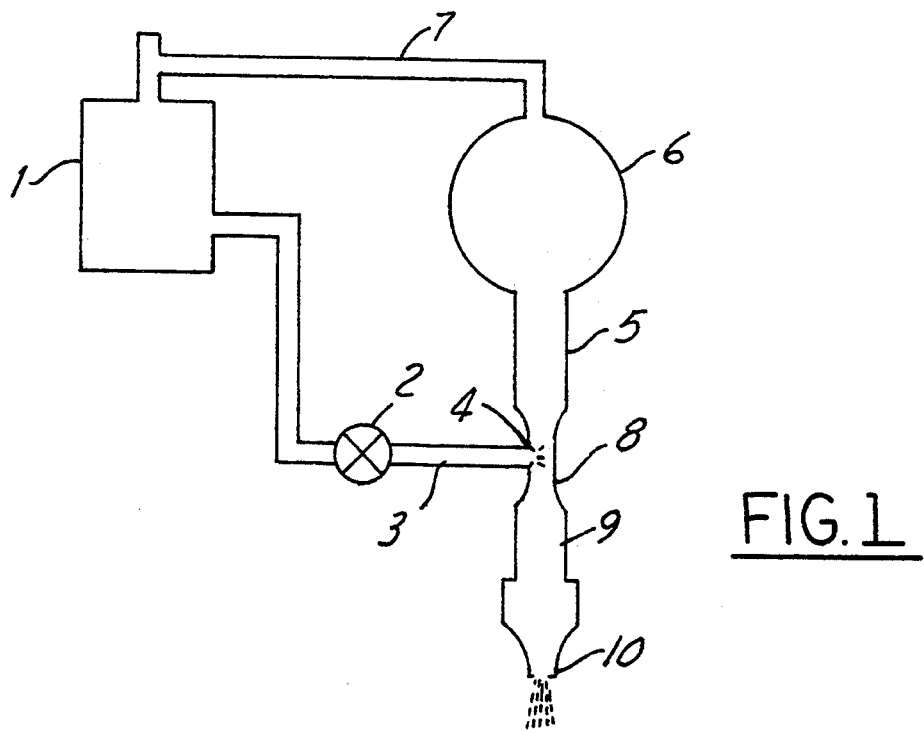
FIG. 1 shows diagrammatically a lubricating system according to the present invention.

Referring first to FIG. 1, oil from reservoir 1 is fed by metering pump 2 via pipe 3 to jet 4 from which it is delivered into a stream of compressed air flowing in pipe 5 from compressed air rail 6 of the engine fuel injection system, at a regulated pressure of about 6 bar, so as to form an aerosol mist of oil in air.

Compressed air rail 6 may be connected by a further pipe 7 to oil reservoir 1 so that the air pressure can assist pump 2 in supplying oil to jet 4. Pipe 7 should include a flow restrictor (not shown) to minimize the loss of pressure in rail 6 which would otherwise occur when oil reservoir 1 is opened to replenish the oil supply. A flow restrictor in pipe 7 will also serve to reduce the pumpup time required to bring the pressure in rail 6 back to operating pressure for the fuel injection system, should the pressure fall off for any reason.

The jet arrangement used for the purpose or atomizing the oil may be of any known kind. For example, it may be a carburetor comprising a venturi section 8 in the compressed air pipe 5, with the oil inlet 4 opening into venturi section 8.

The oil/air mist formed is then carried by the compressed air steam down a pipe 9 to one or more lubricating nozzles or jets 10 located at lubricating points. If desired, separate atomizing units may be associated with some or all of the lubricating nozzles 10 instead of feeding them from a common atomizer.

Figure 2:
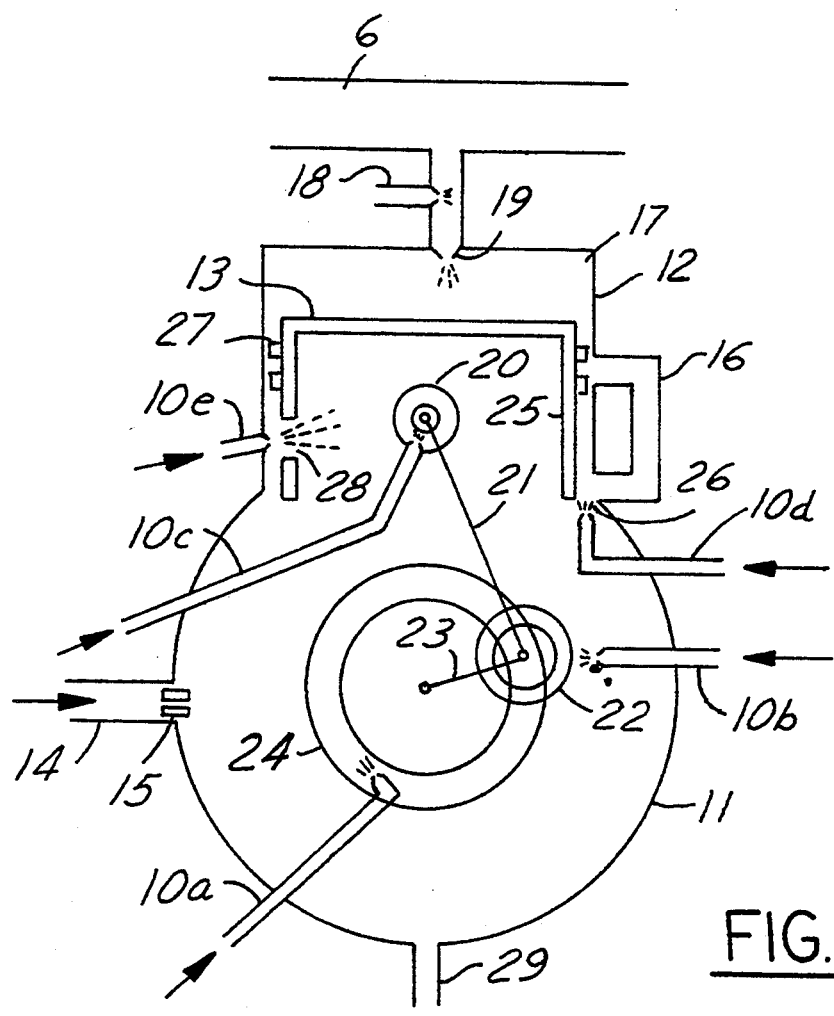
FIG. 2 shows, also diagrammatically, a cylinder of a two-stroke engine with various lubrication jets or nozzles according to the present invention.

As shown in FIG. 2, lubricating points are located in the crankcase 11 and cylinder 12 of a two-stroke engine in which a piston 13 reciprocates.

The crankcase is provided in conventional manner with an air intake 14 with a reed valve 15 at its orifice and is connected by a transfer line 16 to the upper part 17 of the cylinder 12 which forms the combustion chamber.

During the return stroke of piston 13, air entering crankcase 11 from air intake 14 via reed valve 15 is pumped from the crankcase through transfer line 16 into combustion chamber 17, where it is mixed with fuel injected through fuel atomizing jet 18 into a stream of compressed air flowing past jet 18 from compressed air rail 6 and injected through fuel injection nozzle 19 into combustion chamber 17, where the mixture is ignited.

Piston 13 is connected in the usual manner an small-end bearing 20 to connecting rod 21 linked at big end bearing 22 to crankshaft 23 having main bearing 24. To provide lubrication of these bearings, nozzles or jets 10 which deliver a mist of oil atomized in air as shown in FIG. 1 are directed towards some or all of the bearings so as to discharge in their immediate vicinity. Thus, nozzle 10a is directed toward main bearing 24, nozzle 10b is directed at big end bearing 22, and nozzle 10c at small end bearing 20. An additional nozzle, 10d, may be provided to deliver atomized oil between skirt 25 of piston 13 and wall or lining 26 of cylinder 12, to lubricate piston skirt 25 and piston rings 27. For further or alternative lubrication of small-end bearing 20, a nozzle 10e having an appropriately timed intermittent delivery may be directed inwardly, through the cylinder wall and an aperture 28 in piston skirt 25. The timing may be controlled automatically by the relative positions of the aperture 18 and the piston skirt 25.

Control means (not shown) are preferably provided to ensure that on starting up the engine, oil metering pump 2 is started and the compressed air supply from rail 6 is connected to the atomizing unit or units as or before the engine is cranked. It will be appreciated that on starting the engine, it may be necessary to crank the engine to operate the air compressor pump (not shown) to raise the pressure in air rail 6 to the level required for operation of the fuel injection system. During this period, the invention ensures that lubrication is already available.

Oil delivered from lubrication nozzles 10 that collects in the bottom of crankcase 11 may be removed through a drain line 29 and returned, after filtering, for recirculation, either upstream of the oil metering pump 2 or to oil reservoir 1.

The system may also include means for controlling the output of the metering pump responsive to the speed and/or load of the engine and to engine and ambient temperatures, and means to temporarily increase the output of the pump on starting up and/or stopping the engine.

Although the invention has been described with reference to a single cylinder, it will be appreciated that it is equally applicable to a multicylinder engine in which the cylinders have a common compressed air rail.

I claim:

1. A two-stroke engine having a pressurized air rail for producing an atomized fuel spray for injection into individual combustion chambers, in which oil for lubrication is atomized by metering said oil into a stream of compressed air taken from the rail or from a reservoir connected thereto and the resulting oil/air mist is injected into the crankcase directly upon points requiring lubrication.

2. A two-stroke engine according to claim 1, wherein each cylinder of the engine is provided with a plurality of lubricating nozzles directing the atomized oil locally to one or more of the small end bearing, the big end bearing and the area of the cylinder or cylinder liner contacted by the piston skirt.

3. A two-stroke engine according to claim 2 which also includes lubricating nozzles directing the atomized oil to the crankshaft main bearings.

4. A two-stroke engine according to claim 2, wherein the compressed air flows continuously through the lubricating nozzles.

5. A two-stroke engine according to claim 2, wherein the compressed air source for atomization of the oil is maintained at a pressure of at least 6 bar.

6. A two-stroke engine .according to claim 1, further comprising a supercharger, wherein the supply of compressed air for atomizing the oil is supplemented by compressed air from-the supercharger.

* * * * *